ELECTRONIC SYSTEM FOR GENERATING A PERSPECTIVE IMAGE

Filed Aug. 22, 1961 4 Sheets-Sheet 1

INVENTORS
ARTHUR R. TUCKER
MARVIN WEISS
BY
Myron Amer
ATTORNEY

INVENTOR.
ARTHUR R. TUCKER
MARVIN WEISS
BY
Myron Amer
ATTORNEY

INVENTOR.
ARTHUR R. TUCKER
MARVIN WEISS
BY
Myron Amer
ATTORNEY

INVENTOR.
ARTHUR R. TUCKER
MARVIN WEISS
BY
Myron Amer
ATTORNEY

United States Patent Office 3,060,596

Patented Oct. 30, 1962

3,060,596

ELECTRONIC SYSTEM FOR GENERATING A PERSPECTIVE IMAGE

Arthur R. Tucker, Woodcliff Lake, N.J., and Marvin Weiss, Pearl River, N.Y., assignors to Dalto Electronics Corporation, Norwood, N.J., a corporation of Delaware Filed Aug. 22, 1961, Ser. No. 134,028
3 Claims. (Cl. 35—10.2)

The present invention relates both to an electronic system for generating a perspective image of a plane surface from a plan view of said surface, and to the adaptation of said electronic system to the specific use as a visual attachment for a flight trainer.

In the first mentioned or broader aspect of the invention, it is an object to electronically generate in a display the perspective image of any plane surface from a plan view of said surface, said generated perspective image being that as if seen from a known fixed point and at a known elevation above said surface.

Another object is to generate said perspective image by a flexible electronic system in which both the point from which the perspective image is imagined and the elevation of said point above said surface can be readily changed.

Still another object is to combine with the flexible electronic system, in which as just mentioned a perspective image of a surface can be generated as viewed from any point and at any elevation, suitable means for also simulating changing flight motions of an aircraft relative to said viewed surface (which in this instance is more particularly an airfield) to thereby provide a novel visual attachment for a flight trainer.

Various other objects and advantages will appear from the following description of several embodiments of the invention, and the novel features will be particularly pointed out hereinafter in connection with the appended claims.

Included within the scope of the present invention is the technique, including methods and apparatus, of electronically generating a controlled distorted display of the detail of a plane surface in which the foreground portion of said detail has both a greater apparent horizontal and vertical size than the background detail. A generated display with this two direction distortion of foreground detail has been found to provide a realistic visual impression of the plane surface as viewed in perspective. More particularly, what are actually parallel lines on the surface are reproduced in the generated display with a realistic apparent convergence upon a vanishing point, exactly as if to mention a common illustrative example, there is an apparent convergence, when viewed in perspective, of parallel railroad tracks.

In accordance with the present invention, a plan view of an airfield (as one example of a plane surface) is reproduced on a film transparency, and the distortions mentioned above required in a perspective image of said airfield are electronically reproduced primarily by the triangular shape and the line spacing of a generated raster of a spot scanning cathode ray tube scanning the detail of this transparency. That is, in accordance with the methods and in conjunction with other apparatus which will be described in detail subsequently, it has been found that the technique of using a greater concentration of the sweep lines of said scanning raster over what is the foreground area of the transparency provides the apparent greater vertical size to foreground detail in the final generated perspective image, and that the technique of sweeping each raster line between end limits which are outwardly divergent as exists in a triangular shaped raster provides the apparent greater horizontal size to said foreground detail.

An electronic system for generating a perspective image of a plan view of a plane surface such as will be described herein can be used to advantage not only as part of a visual attachment for a flight trainer, but also in other applications, and although the description will relate the system to the generation of a perspective image of an airfield having in mind the specific end use as a visual attachment for a flight trainer, it will be understood that this is not intended as a limitation on the scope of the invention.

Figure 1:
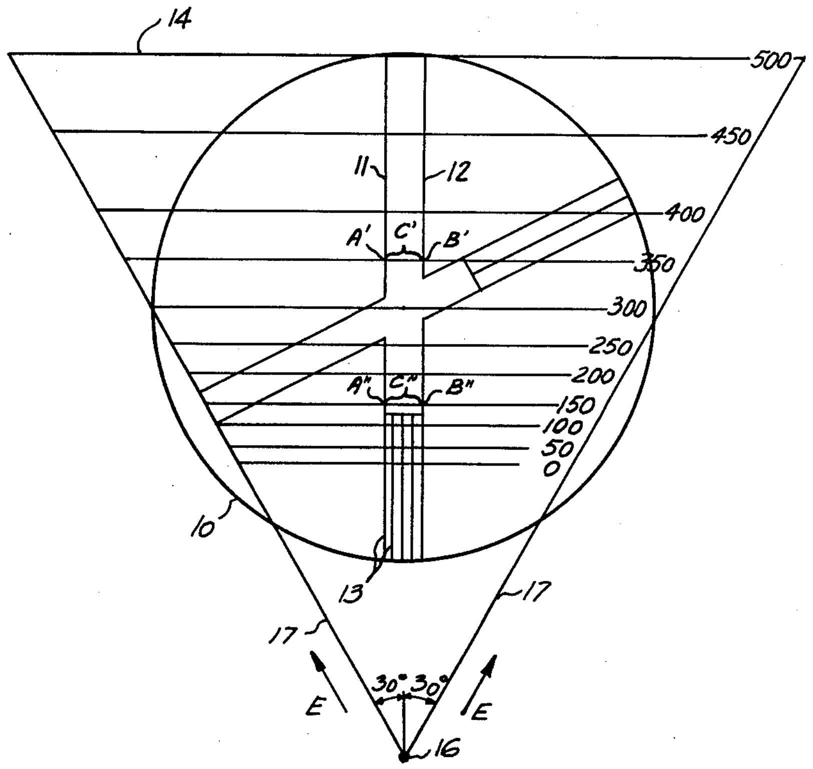
FIG. 1 shows a scanning raster having variable raster line spacing and a triangular shape superimposed over a plan view of an airfield.

Before describing the apparatus which forms the electronic system of the present invention, the underlying principles of this system will be explained. This can best be done by analyzing a generated perspective image display in relation to the plan view of an airfield and to the scanning raster which is used to sense the detail of this airfield. Accordingly, reference is first made to FIG. 1 illustrating a plan view of an airfield 10 having such conventional surface detail as parallel runway lines 11 and 12 (which at night would be illuminated and correspond to runway lighting) and approach guide line markings 13 (which likewise would be illuminated at night and correspond to runway approach lighting). Other surface detail which is conventionally part of an airfield has been omitted since the surface detail mentioned is sufficient for a complete understanding of the present invention. As shown in FIG. 1, superimposed over the plan view of the airfield 10 is a triangular shaped raster 14 which is used to scan the surface detail of the airfield 10. The requirements for the scanning raster 14 are that the position of its vertex 16 represent the simulated location of an aircraft, fixed as to position and altitude, from which the perspective image of the airfield 10 is imagined, and that the sweep limits or opposite sides 17 of said raster extend equally in outwardly divergent directions, more particularly designated by the reference letter E in FIG. 1, from the vertex 16. For flight training purposes it is sufficient that the horizontal range of visibility from the aircraft be 60 degrees and thus the included angle between the raster sides 17 is 60 degrees and the triangle shown is equilateral, but other included angles are also possible provided only that there is an equal outward divergence in both the raster sides 17 and thus the shape of the scanning raster 14 may also be that of an isosceles triangle. In addition to a triangular shape, it is also required that the sweep line spacing of the scanning raster 14 be concentrated over the foreground area of the airfield 10, and to illustrate this feature (assuming a 500 horizontal line raster) every 50th raster line of the scanning raster 14 has been numbered in FIG. 1.

Figure 2:
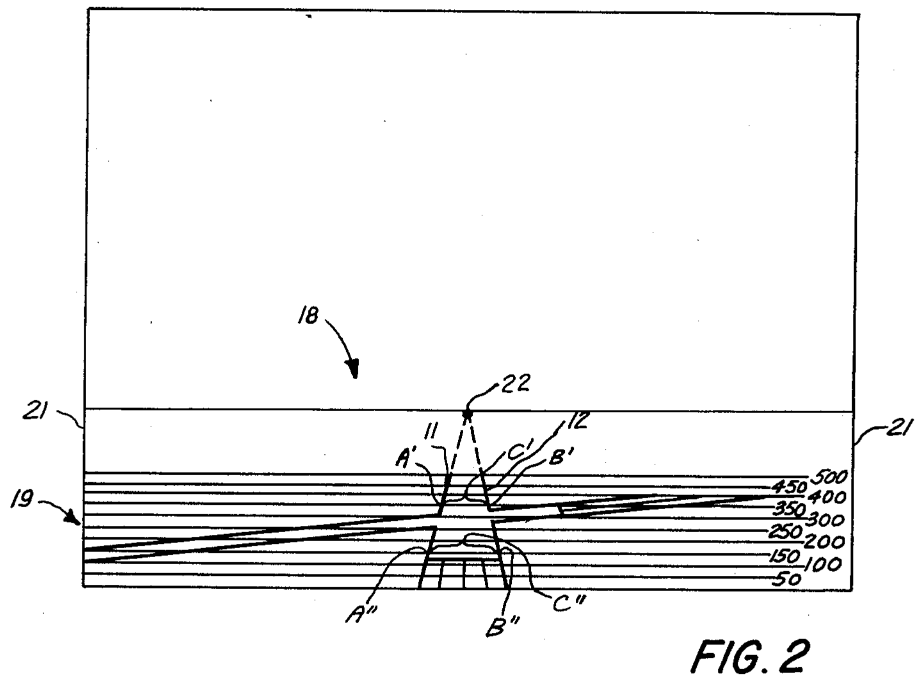
FIG. 2 shows a generated perspective image of the airfield of FIG. 1.

FIG. 1 is to be compared with FIG. 2, in which the illustrated perspective image, designated 18, will be understood to be that of the plan view of the airfield of FIG. 1. This perspective image 18 is more particularly shown as it appears in a generated display raster 19 having a conventional rectangular shape with substantially parallel opposite sides 21 and formed by 500 equally spaced horizontal sweep lines. As in the case of the scanning raster 14 of FIG. 1, every 50th raster line shown in FIG. 2 has been numbered. It will be understood that both the scanning raster 14 and the display raster 19 are generated in synchronized unison, such that for example when the scanning raster 14 is generating its 350th raster line and sensing the surface detail on the plan view of the airfield 10 located along this line, the corresponding 350th line of the display raster 19 is likewise being generated and reproducing the surface detail being sensed, and that both the 350th lines of the respective rasters are completed in the same interval of time.

Thus, it will be appreciated that the foreground surface detail of the airfield 10 as sensed by the more concentrated raster lines numbered 0 to say 150 of the scanning raster 14, will when reproduced in the equally spaced corresponding raster lines numbered 0 to 150 of the display raster 19 have a greater apparent vertical size to a party viewing the display raster 19 than the background surface detail of the airfield 10 which is scanned in the remaining lines numbered 151 (not shown) to 500 of the scanning raster 14 and reproduced in the same corresponding numbered lines of the display raster 19.

In addition to an apparent greater vertical size of foreground surface detail, said foreground detail must also have an apparent greater horizontal size. This is for the reason that it is the combined effort of an apparent greater vertical and horizontal size of foreground detail which creates the visual impression in the perspective image 18 of an apparent convergence of parallel lines upon a vanishing point which is characteristic of a perspective view, such as for example the apparent convergence of the parallel runway lines 11 and 12 upon the vanishing point 22. Again referring to the generated scanning raster 14 of FIG. 1, and more particularly to the 350th line thereof, it will be seen that the two items of surface detail encountered by this scan line are the points A′ and B′ on the runway lines 11 and 12 respectively, and that the spacing or distance C′ between the points A′ and B′ represents approximately 7% of the total sweep time of this raster line. These surface detail points A′ and B′ are reproduced in the corresponding 350th line of the display raster 19 with a spacing C′ therebetween representing the same time interval of 7% of the total sweep time since as mentioned both rasters are generated in synchronized unison. However, in the shorter lower numbered raster lines of the scanning raster 14, as for example in the 150th line, the distance C″ (which in the plan view of the airfield 10 equals the distance C′) now represents approximately 9% of the total sweep time of this raster line. Thus, the surface detail points A″ and B″ sensed by the 150th scanning raster line are now reproduced in the corresponding 150th display raster line with a time interval therebetween representing 9% of the total sweep time, and this in turn results in a greater spacing C″ between these points as generated for display in the display raster 19. In this manner, therefore, equal horizontal size of foreground and background detail in the plan view of the airfield 10 is reproduced or generated in the display raster 19 with the horizontal size of foreground detail enlarged.

Figure 3:
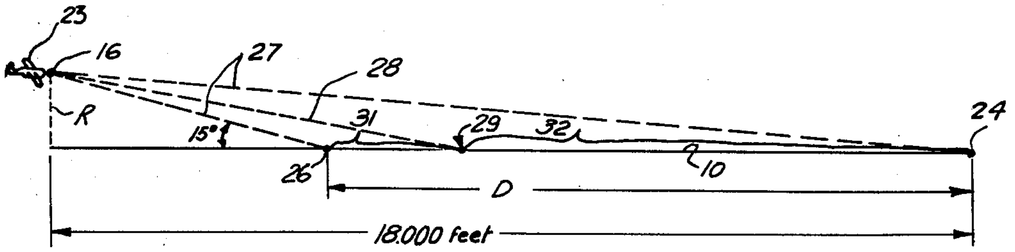
FIG. 3 shows the point from which the perspective image of FIG. 2 is imagined.
Figure 4:
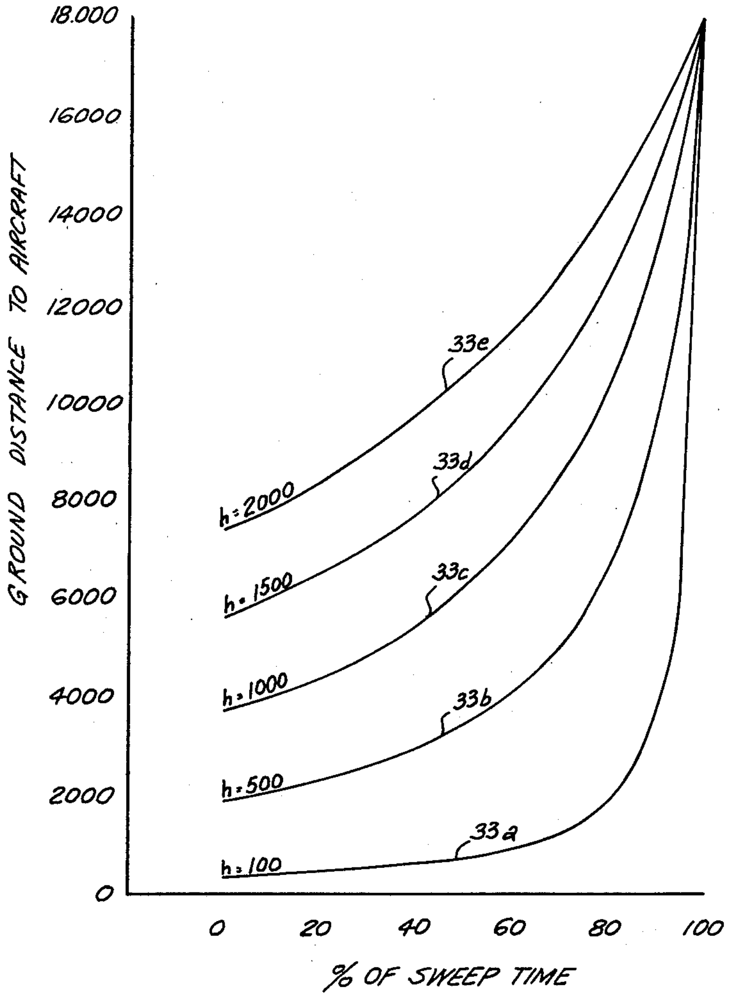
FIG. 4 is a plot of vertical sweep curves for generating perspective images, such as is shown in FIG. 2.

The need for concentrating the sweep lines in the foreground area of the plan view of the airfield 10 to provide greater apparent vertical size to foreground surface detail is best explained with reference to FIG. 3. In this figure, an aircraft 23 is illustrated at a known altitude above the horizontal and will be assumed to have visibility measured in ground distance along the horizontal of 18,000 feet to the point 24. The other limitation to visibility, due to aircraft obstruction, will be assumed to be a depression angle of 15 degrees marking the point 26. Thus, the surface area of the airfield 10 which makes up the perspective image 18 of FIG. 2 visible from the aircraft 23 and assuming the position of the aircraft 23 at the fixed point 16, is that designated D. If further, the view angle 27 just defined is bisected as by the dotted line 28, and the intersection point 29 is considered the separation of foreground and background areas, it will be seen that the foreground area 31 of the visible airfield surface D is proportionally less of the total surface in view than the background area 32. Thus, to show the surface detail of the foreground area 31 it is necessary to concentrate more sweep lines of the scanning raster in the half of the vertical sweep time of this raster corresponding to the lower half of the view angle 27 than in the remaining half of the vertical sweep time corresponding to the other half of the view angle. This disproportionate relationship of foreground to background areas varies with each altitude of the fixed point 16 from which the perspective image is imagined, but can be reduced to a mathematical expression for the required shape of the vertical sweep control for any known altitude of the fixed point 16 relative to the airfield 10. The development of this mathematical expression is omitted from this description as being within the ordinary skill of a trained engineer or mathematician, but for completeness, the calculated shape of the required vertical sweep controls **33*a*, 33*b*, 33*c*, 33*d* and 33*e* for the scanning raster are provided in the graph of FIG. 4 for altitudes ranging from 100 feet to 2000 feet at intervals of 500 feet. In this graph "ground distance to aircraft" is plotted against "percent of vertical sweep time." Thus, assuming an aircraft at an altitude of 1500 feet, the depression angle of 15 degrees from said aircraft will intersect the ground at approximately 5400 feet forward of the aircraft, and the ground distance forward of this intersection point to say the 8000 foot mark, or 2600 feet of visible foreground surface, should be allotted the 250 sweep lines of 50% of the total vertical sweep time, whereas the remaining ground distance from the 8000 foot mark to the 18,000 foot mark, or 10,000 feet of visible background surface, should be allotted the remaining 250 sweep lines of the scanning raster 14. Naturally, the spacing between adjacent raster lines is not constant but varies as a function of the rate of change of curvature of the vertical sweep control 33*d***.

Figure 5:
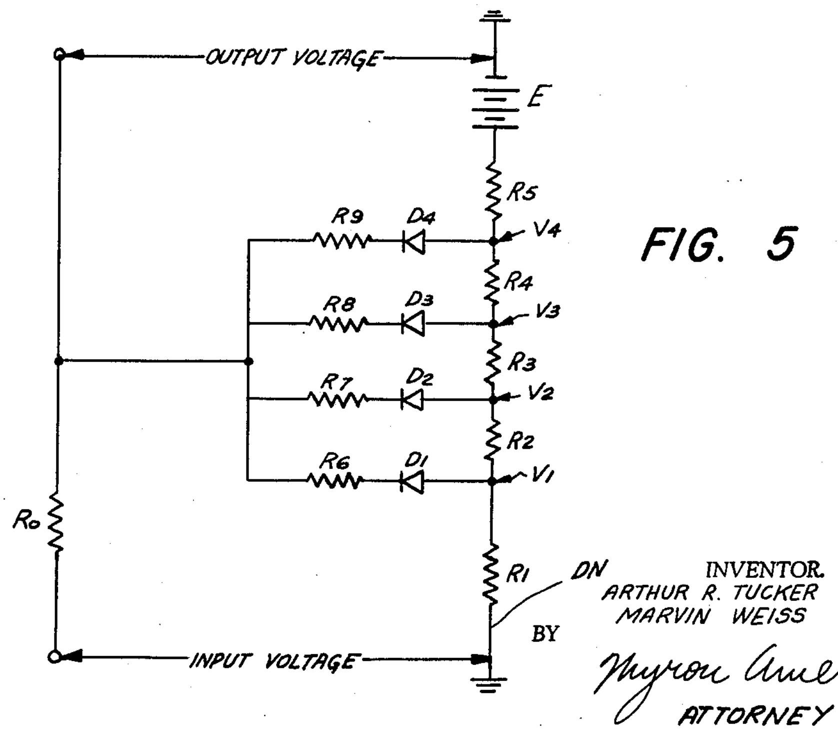
FIG. 5 is a diagram of the circuitry for generating a voltage following the curves of FIG. 4.

The circuitry for generating a voltage to be applied to deflection plates of a cathode ray tube which changes in accordance with the rate of change of curvature of any of the just mentioned vertical sweep control curves is believed to be within the skill of a trained engineer, and therefore is not essential to this description. However, since this circuitry is not known to be commercially available per se, a brief description thereof will now be given with reference to FIG. 5. As shown in this figure a reference voltage divide network DN is provided consisting of a reference D.C. voltage E and series connected resistances R1 to R5 which establish progressively higher reference voltages V1 to V4. These reference voltages control operation of the diodes D1 to D4 in relation to an increasing applied input voltage. That is, until the applied input voltage in turn equals the reference voltages V1 to V4 the corresponding diodes D1 to D4 will each be forward biased to complete the output voltage circuit through the parallel branch circuits and thus through the resistances R6 to R9. Assuming, therefore, the input voltage initially to be zero, the output voltage is equal to the reference voltage E divided by the ratio of voltage drop across resistance R*o* to the voltage drop across the parallel combination of resistance R6 to R9. Relating this to FIG. 4, this initial output voltage will be understood to correspond to the initial point on any of the curves of this figure. Thereafter, as the input voltage rises, the output voltage also rises, but at a slow rate of change because the change in input voltage as has been mentioned is divided by the ratio of voltage drop across resistance $Ro$ to the voltage drop across the parallel combination of resistance R6 to R9. Thus, the initial rate of change in output voltage is appropriately gradual and corresponds to the slow rate of change of curvature in the initial portions of the curves of FIG. 4. Eventually, however, the input voltage reaches a value where it equals the reference voltage V1 with the result that diode D1 is no longer forward biased. This in turn results in the resistance R6 being removed from the circuit and the output voltage rising more rapidly with each change in input voltage. Thus, each time the increasing input voltage passes the reference voltages V1 to V4 set up by the divide network DN, the rate of increase in output voltage becomes greater with each change in input voltage. This acceleration in the rate of change in output voltage thus corresponds to the greater slope or increased rate of change in curvature of the terminal portions of the curves of FIG. 4. The circuitry just described will be understood to be part of the control unit 41 of the electronic apparatus now to be described with reference to FIG. 6.

*Apparatus of the Electronic System*

A system, as has been just described, having the capability of generating a perspective image of an airfield from a plan view of said airfield can readily be practiced or carried out electronically and by a wide variety of electronic components. The particular electronic components however, which are preferred and their operational relationship, are diagrammatically illustrated in FIG. 6.

Figure 6:
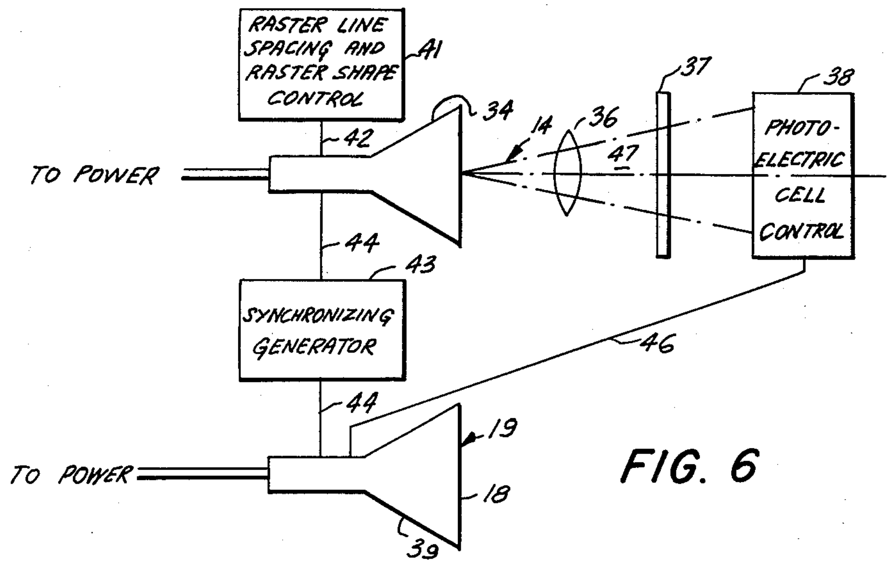
FIG. 6 is a block diagram of the apparatus of an electronic system for generating a perspective image, such as is shown in FIG. 2.

In FIG. 6, a spot scanning cathode ray tube which may be of the type identified as 5AUP24 and is commercially available from the Radio Corporation of America is designated by the reference numeral 34. Disposed in sequence along the optical axis of the tube 34 is a light focusing lens 36 and a film transparency 37 on which it will be understood has been reproduced the plan view of the airfield 10 of FIG. 1. Located behind the film transparency 37 is a light sensitive photoelectric cell 38 which may be of the type identified as 2P21 and also is commercially available from the Radio Corporation of America. Completing the major components of the electronic system of FIG. 6 is a display cathode ray tube 39 which may be the type identified as 17AUP11 and is commercially available from the Radio Corporation of America.

To obtain operation of the tubes 34 and 39 in accordance with the methods of the present invention previously described, a suitable control unit 41 is connected by the line 42 to the tube 34 and will be understood to provide both variable adjustment of the spacing of the raster lines of this tube and also control over the sweep limits to produce a triangular shaped raster; and a suitable synchronizing generator 43 connected by the lines 44 to both the tubes 34 and 39 will be understood to electronically link these tubes so that their operation is in synchronized unison. Also diagrammatically illustrated is a controlling line connection 46 between the photoelectric cell 38 and the tube 39 which will be understood to place the formation of a light spot in the generated raster of the tube 39 under the control of the photoelectric cell 38.

In the operation of the electronic system of FIG. 6 the cumulative effect of the sweeping light spot which makes up the generated raster 14 of the tube 34 is the projection of a beam of light 47 upon the film transparency 37. Since the surface areas of the film transparency 37 have varying degrees of transparency, there results in a light spot of varying intensity at each raster position passing through the film transparency and falling on the photoelectric cell 38. Pulsed by these light signals the photoelectric cell 38 causes the display cathode ray tube 39 to form a light spot of a corresponding intensity in a corresponding position of its generated raster 19. The display thus formed in the generated raster 19 of the tube 39 is therefore that of the surface detail on the film transparency 37 but modified from a plan view to a perspective image 18.

*Apparatus of a Visual Attachment for a Flight Trainer*

To adapt the electronic system of FIG. 6 to the specific end use as a visual attachment for a flight trainer, it is necessary to combine with the components illustrated in FIG. 6 (and depicted by the same but primed reference numerals in FIG. 7) suitable means for simulating the usual flight motions of an aircraft. These flight motions are changes in altitude, lateral and longitudinal movement of the aircraft relative to the airfield, roll, pitch, and yaw.

Figure 7:
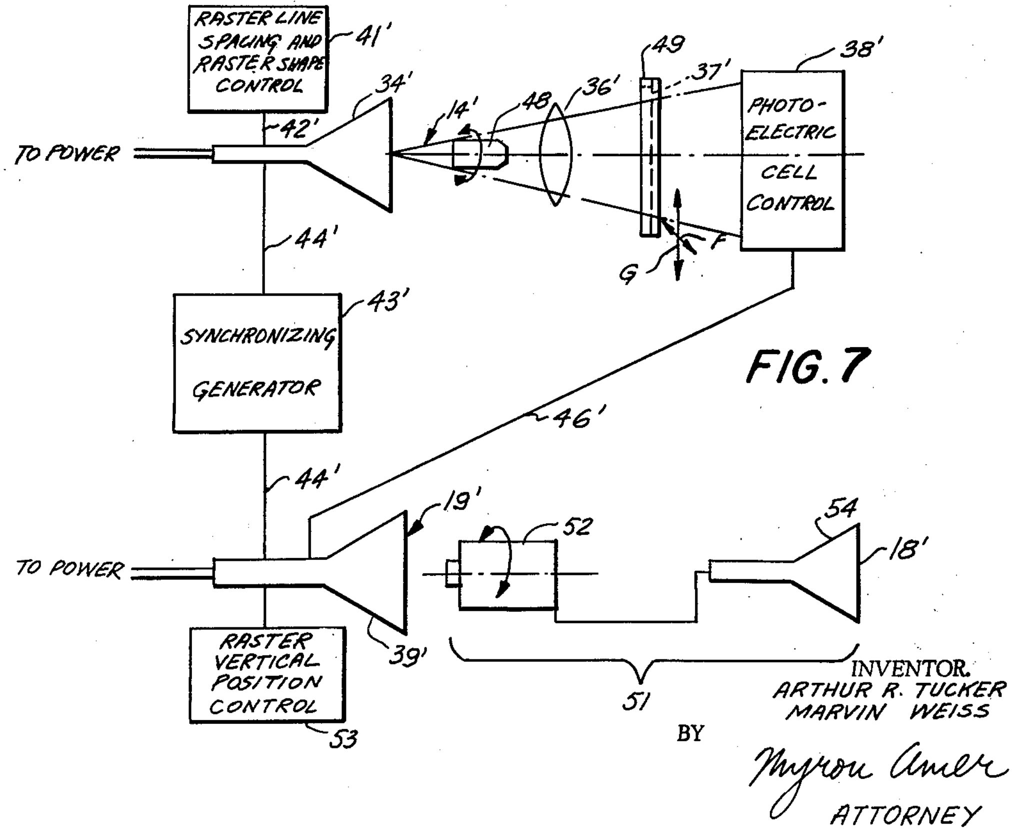
FIG. 7 is a block diagram of the electronic apparatus of FIG. 6 combined with additional apparatus, illustrated diagrammatically, for adapting said electronic apparatus to the specific end use as a visual attachment for a flight trainer.

As shown in FIG. 7, a pechan prism 48 is disposed along the optical axis of the tube 34' between it and the lens 36', and will be understood to be mounted by suitable means for rotation about its optical axis, and by this degree of movement is capable of simulating the flight motion of yaw.

Also the film transparency 37' in this embodiment is more particularly mounted in a movable frame 49, the movement of which in the transverse direction F simulates the flight motion of lateral movement. Continuous vertical movement in the direction G of the frame 49 simulates longitudinal movement of the aircraft relative to the airfield.

To simulate the flight motion of roll, use is made of a closed circuit television system 51 including a camera 52 for viewing the raster display of the tube 39' and a second display cathode ray tube 54 for final display of the perspective image 18'. The camera 52 is mounted for rotation about its optical axis to simulate aircraft roll.

To simulate pitch, a suitable control unit 53 is connected to the tube 39' and will be understood to permit vertical adjustment of the image being displayed on the screen of this tube.

The ability to simulate the remaining flight motion of change in altitude is a feature of the electronic system per se, and is done electronically by striking the appropriate balance in emphasis in foreground and background surface detail for each specific altitude. As previously indicated this is done primarily by the variable raster line spacing and triangular shape of the scanning raster of the tube 34' and will be understood to be under the control of unit 41'.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A system for generating a perspective image of a plane surface as viewed from a fixed point and at a known elevation above said surface, said system comprising a film transparency of the plan view of said surface, a scanning means for scanning said film transparency with a light spot in a succession of sweeps of said light spot, the spacing of the sweeps of said scanning light spot being relatively more concentrated over the foreground area of said film transparency than over the background area, and the distance of each sweep of said light spot, proceeding in the direction of foreground area to background area of said film transparency, being progressively larger in each successive sweep, a display means for generating a display of said perspective image also in a succession of sweeps, each sweep of which however is equally spaced and of the same distance, both said scanning means and display means being connected to sweep in synchronized unison such that corresponding sweeps of each are completed in the same time interval, and light sensitive means arranged to sense each light spot of the scanning means which passes through the film transparency and operatively connected to said display means to cause said display means at this time to form a light spot in its generated display, whereby the foreground detail on said film transparency that is sensed by the scanning means and light sensitive means is reproduced in the generated display of said display means with enlarged vertical and horizontal size as is characteristic of a perspective image.

2. An electronic system for generating a perspective image of a plane surface as viewed from a fixed point and at a known elevation above said surface, said system comprising a film transparency of the plan view of said surface, a spot scanning cathode ray tube adapted to generate a raster in which the opposite sides of said raster are outwardly divergent from a point which is representative of the fixed point from which said perspective image is imagined, and in which the raster line spacing is relatively more concentrated in the narrower area of the raster than in the wider area of the raster, said spot scanning cathode ray tube being arranged to project its shaped raster as a light beam upon said film transparency, a display cathode ray tube also adapted to generate a raster, but one having equally spaced raster lines and substantially parallel opposite sides, both said cathode ray tubes being connected to sweep in synchronized unison such that corresponding lines of their respective rasters are generated in the same time interval, and light sensitive means arranged to sense each light spot of the projected beam of said spot scanning cathode ray tube which passes through said film transparency and operatively connected to said display cathode ray tube to cause said display cathode ray tube at this time to form a light spot in its generated raster, whereby the foreground detail on said film transparency that is sensed by the spot scanning cathode ray tube and light sensitive means is reproduced in the generated raster of said display cathode ray tube with enlarged vertical and horizontal size as is characteristic of a perspective image.

3. A visual attachment for a flight trainer comprising the combination of an electronic system as claimed in claim 2 with means for simulating the flight motions of an aircraft, said means including: a frame for mounting the film transparency and means for moving said frame vertically and transversely; a pechan prism disposed along the optical axis of the spot scanning cathode ray tube between it and said film transparency and means for rotating said prism about its optical axis; a closed television system including a camera for viewing the raster display of the display cathode ray tube and means for rotating said camera about its optical axis; and means for adjusting the vertical position of the raster display of said display cathode ray tube.

References Cited in the file of this patent

UNITED STATES PATENTS

| | | |
|---|---|---|
| 2,975,671 | Hemstreet | Mar. 21, 1961 |
| 3,015,988 | Hemstreet | Jan. 9, 1962 |